(No Model.)

M. I. GOLDSMITH.
Combined Plant Setter and Fertilizer Distributer.

No. 239,764. Patented April 5, 1881.

WITNESSES:
A. Schehl.
C. Sedgwick.

INVENTOR:
M. I. Goldsmith
BY Munn & Co
ATTORNEYS.

UNITED STATES PATENT OFFICE.

MARY I. GOLDSMITH, OF THE PLAINS, VIRGINIA, ASSIGNOR TO HERSELF AND JOHN M. GOLDSMITH, OF SAME PLACE.

COMBINED PLANT-SETTER AND FERTILIZER-DISTRIBUTER.

SPECIFICATION forming part of Letters Patent No. 239,764, dated April 5, 1881.

Application filed January 27, 1881. (No model.)

*To all whom it may concern:*

Be it known that I, MARY ISHAM GOLDSMITH, of The Plains, in the county of Fauquier and State of Virginia, have invented a new and useful Improvement in Combined Plant-Setters and Fertilizer-Distributers, of which the following is a specification.

Figure 1:
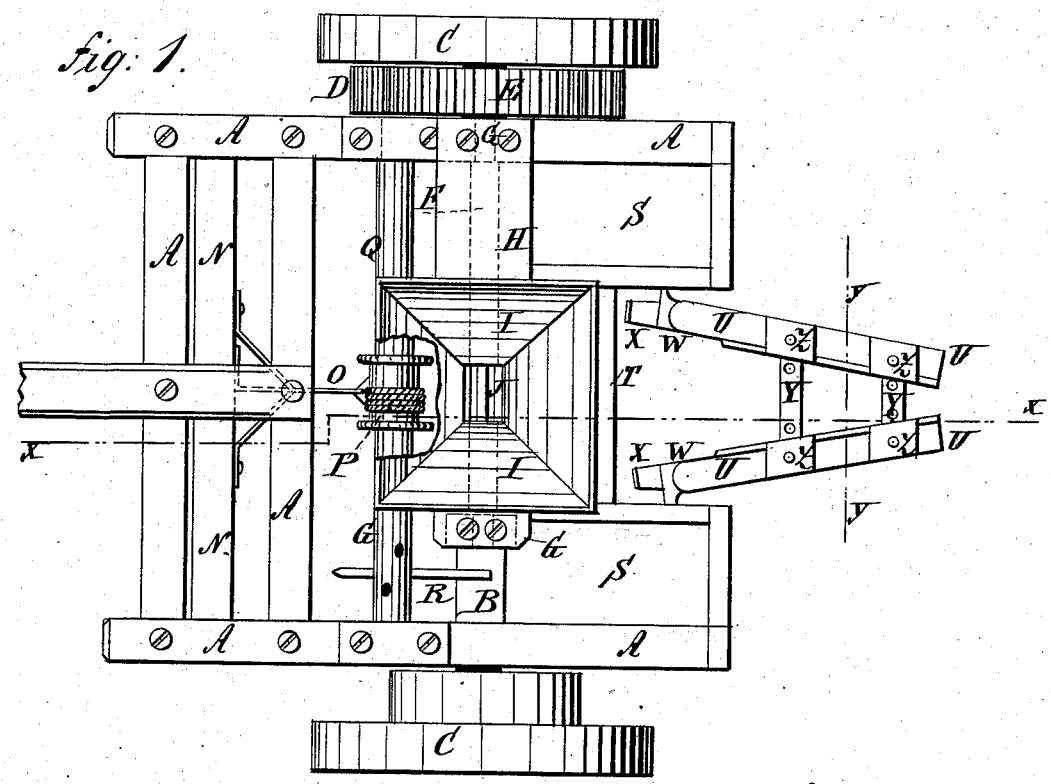
Figure 3:
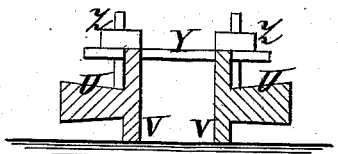
Figure 2:
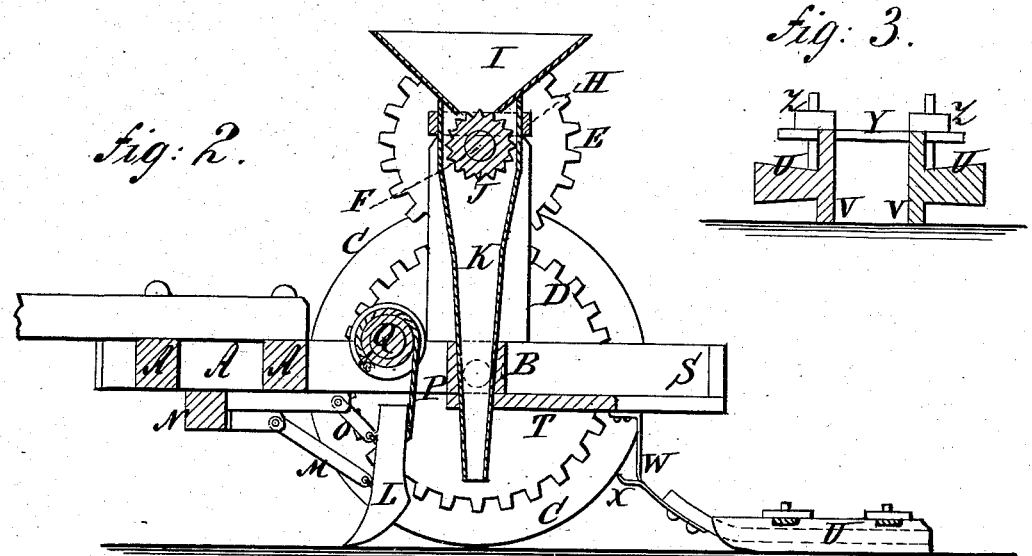

Figure 1 is a plan view of my improvement. Fig. 2 is a sectional side elevation of the same, taken through the line $x\ x$, Fig. 1. Fig. 3 is a sectional elevation of the coverer, taken through the line $y\ y$, Fig. 1.

Similar letters of reference indicate corresponding parts.

The object of this invention is to facilitate the operation of setting tobacco and other plants, and applying fertilizers thereto.

A represents the frame of the machine, to the rear part of which is attached the axle B of the wheels C.

To one of the wheels C is attached a large gear-wheel, D, the teeth of which mesh into the teeth of a smaller gear-wheel, E, attached to the end of a shaft, F. The shaft F revolves in bearings in uprights G, attached to the frame A, and connected at their upper ends by a board, H, which board serves as a platform to support the hopper I, that receives the fertilizer.

To the shaft F is attached a toothed wheel, J, the upper side of which projects into the bottom of the hopper I, so as to take the fertilizer from the hopper I and discharge it into the tube K, through which it passes to the ground. The upper part of the tube K passes through and is attached to the board H, and is enlarged or made funnel-shaped, so as to surround the toothed wheel J and prevent the fertilizer from being scattered. The amount of fertilizer distributed can be regulated by slides placed in the lower part of the hopper I. The lower part of the tube K passes through a guide-hole in the axle B, and discharges the fertilizer into the bottom of the furrow opened by the plow L. The draft-strain upon the plow L is sustained by the bar M, the rear end of which is hinged to the lower part of the shank of the plow L. The forward end of the draft-bar M is hinged to a support attached to a cross-bar of the frame A, or to a bar, N, attached to the said frame A. To the upper part of the shank of the plow L is hinged the rear end of a short bar, O, the forward end of which is hinged to a support attached to the frame A. With this construction, should the plow L strike an obstruction, it can swing back to prevent it from being broken.

To the upper end of the shank of the plow L is attached the end of a rope or chain, P, which is wound around, and is attached to, a shaft, Q, so that the plow L can be raised and lowered to adjust it to work at any desired depth in the ground, by turning the shaft Q. The ends of the shaft Q work in bearings attached to the side bars of the frame A, and through the said shaft are formed holes to receive the lever R, by means of which it is turned to raise and lower the plow L. The shaft Q is held in place, when adjusted, by the lever R resting against a cross-bar of the frame A. Several holes may be formed in the shaft Q to receive the lever R, so that it can be placed in one or the other of the said holes, to hold the said shaft in any desired position.

To the rear parts of the side bars of the frame A and the end parts of the axle B are attached shallow boxes or trays S, to receive the tobacco-plants or other plants to be set out.

To the middle part of the axle B is attached a platform, T, to serve as a seat for the man who places the plants in the furrow opened by the plow L. The soil is pressed in around the plants by the bars U, which have flanges V along the inner edges of their lower sides. The forward ends of the bars U are curved upward to cause them to pass over the ground readily, and to the said forward ends are attached the ends of bars W, which project upward and forward, and are attached to the trays S or seat T.

Upon the bars W are formed arms X, to serve as supports or rests for the feet of the man who places the plants in the furrow.

The bars U are connected with their forward ends farther apart than their rear ends, so as to press the soil into the furrow around the plants by two bars, Y, the ends of which are passed through keepers Z, attached to the bars U, and are secured in place in the said keepers by pins or bolts.

With this construction, as the machine is drawn forward, the plow L opens a furrow, and the wheel J and tube K deposit guano or other fine fertilizer in the bottom of the furrow, which fertilizer is covered by the falling in of the soil. The man sitting upon the seat T places the plants in the furrow at the proper distance apart, and the soil is pressed in around the plants by the flanged bars U.

If desired, the machine may be used for planting corn and cotton-seed, in which case the bars U can be detached and replaced by small plows to cover the seed, and the soil can be pressed down upon the seed by rollers pivoted to and between the rear ends of bars attached at their forward ends to the axle B or frame A; or the said rollers can be connected with and drawn by the covering-plows.

Having thus fully described my invention, I claim as new and desire to secure by Letters Patent—

The combination of an elevated hopper, I, the long tapering tube K, the trays S, the platform T, and the earth-presser U V, all arranged as described, to allow the operator to set out the plants, sow the fertilizer, and press the earth to the plants, as described.

MARY ISHAM GOLDSMITH.

Witnesses:
EPPA HUNTON CREEL,
WILLIAM HENRY CREEL.